June 7, 1955     M. W. HUBER     2,710,206

RUNNING SEAL FOR ROTARY SHAFT

Filed Dec. 11, 1952

INVENTOR
Matthew W. Huber

BY

ATTORNEYS

2,710,206

RUNNING SEAL FOR ROTARY SHAFT

Matthew W. Huber, Watertown, N. Y., assignor to The New York Air Brake Company, a corporation of New Jersey Application December 11, 1952, Serial No. 325,259

5 Claims. (Cl. 286—11.13)

This invention relates to running seals for rotary shafts, the seal being of the type in which a ring fixed to a housing and a ring sealed to a rotary shaft and axially movable thereon, present to each other plane lapped surfaces which are held in contact to form the desired running seal.

The present application is in part a continuation of application Serial No. 254,940, filed November 5, 1951, which became abandoned in favor of the continuing application after the latter was filed.

As heretofore constructed, such devices are expensive to manufacture, troublesome to assemble and unduly complicated, but their greatest disadvantage is undue weight and objectionable bulk. The dimension in the direction of the axis of the shaft is commonly so large as to discourage use of such seals.

The present invention affords an excellent sealing device which is light and remarkably compact. The parts are few in number, simple in form, and economical to manufacture on a precision basis. The seal can be assembled with the utmost ease.

The accompanying drawing shows the device on an enlarged scale, and so does not at first glance suggest the small sizes in which the seal is believed to offer its greatest advantage.

Figure 1:
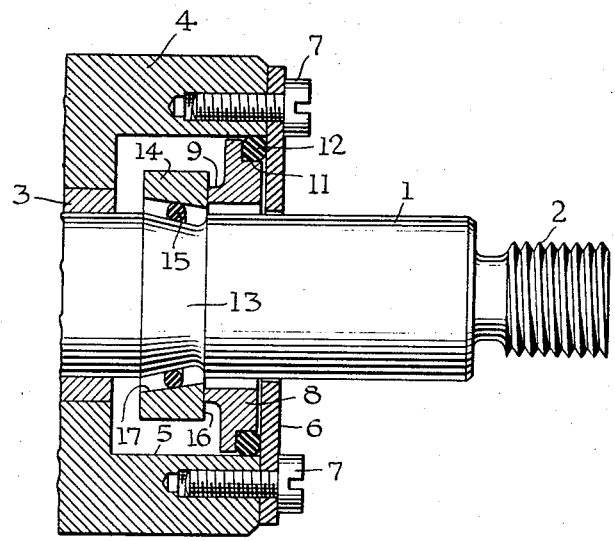
Fig. 1 is an axial section through a bearing structure and seal, with the shaft in elevation.

The shaft 1 has a reduced threaded end 2 to receive a pulley or other driving member. Shaft 1 turns in a bearing 3 fixed in housing 4, and outside this bearing extends through and beyond a counterbore 5 in which the seal is enclosed.

The seal is retained in the counterbore by an annular plate 6 which is fastened to housing 4 by screws 7, and so is readily removable. The plate 6 closely surrounds the shaft but is out of contact therewith.

The fixed member of the seal is a metal ring 8 which has an annular rim 9 at its inner margin on one end face and an encircling marginal channel 11 on the other end face.

A toric sealing ring 12 of resilient material, which could be rubber or one of the synthetic substitutes for rubber fits the counterbore snugly, and seals ring 8 to the housing 4 and to plate 6. The plane end face of rim 9 is a precise plane of high finish and is normal to the axis of ring 8. Ring 8 floats on the ring 12 which need not necessarily be a torus. The ring 12 and groove 11 should be manufactured with a good degree of precision and readily can be. A toric ring mounted under slight circumferential compression gives excellent centering and aligning characteristics and is preferred for that reason.

The shaft 1 near to ring 8 and between this ring and bearing 3 is formed with a tapered or conical surface 13 coaxial with shaft 1. In the illustrated example the taper is formed by grooving the shaft but that detail is not controlling.

A second metal ring 14 floats on a torus 15 of rubber-like resilient material. This may be a synthetic rubber substitute. Ring 14 has a plane face 16 which forms a running seal with the end of rim 9, and is a highly finished plane normal to the axis of ring 14.

The bore of ring 14 is a right circular cone 17 whose taper is slightly less than that of surface 13. Ring 15 rolls between the conical surfaces 13 and 17. It is mounted in tension on the surface 13 and under compression between the surfaces 13 and 17, so as to serve three useful purposes. It forms a seal and also a driving connection between shaft 1 and ring 14. It serves as the elastic loading means to hold ring 14 in sealing contact with rim 9.

The reason for differentiating the tapers of the cones 13 and 17 is the stressed condition of ring 15. As this rolls to the left on cone 13, as viewed in the drawing, the ring stretches and consequently diminishes in cross section and flattens somewhat. The taper differential affords a compensatory reduction of the interval. It is considered advantageous, but is known to be not strictly necessary, as satisfactory results have been had where the geometric elements of the two cones are parallel.

The following is the method of assembly. With the shaft 1 in place in bearing 3, ring 15 is rolled onto the shaft and seats in the groove at the small end of cone 13. The rings 14 and 8 are slipped onto the end of the shaft and pushed in place together. Ring 14 engages ring 15 and rolls it part way up the cone 13. Ring 12 is pressed into its seat and ring 6 is applied and fastened by screws 7. Since the shaft has little or no axial motion the parts retain approximately the positions shown. The rings 14 and 8 have good self-centering and self-aligning characteristics and ring 15 is worked just about enough to retard its deterioration.

Figure 2:
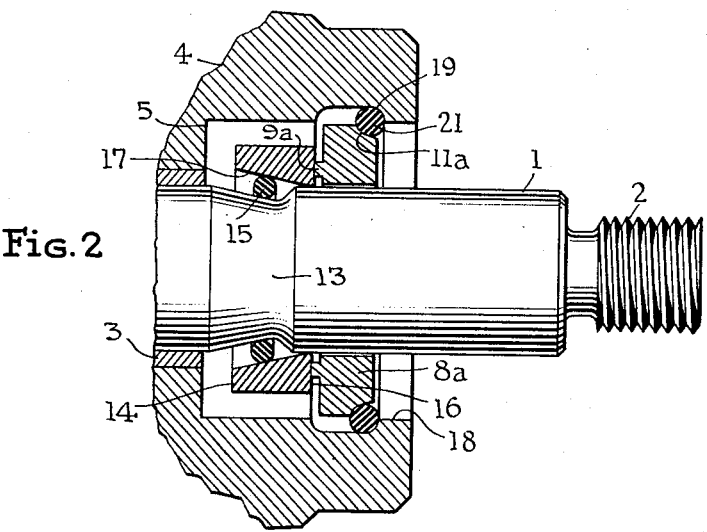
Fig. 2 is a similar view showing a modified embodiment.

In Fig. 2 which shows a modification those parts which are not significantly changed are identified by the numerals used in Fig. 1. These are parts 1–5, inclusive, and 13–17, inclusive. The elements of conical surfaces 13 and 17 are shown parallel, a possibility suggested with reference to Fig. 1.

The annular plate 6 and the screws 7 are omitted, and in lieu thereof housing 4 has, at the outer end of bore 5, an inward-projecting flange 18 with a concave fillet at 19 forming a seat for the ring 21 which is analogous to ring 12. The ring 21 is slightly oversize circumferentially as compared to the seat fillet, so as to be self-retaining.

On ring 8a the sealing rim 9a is spaced outward from the inner margin of the ring, a difference of no functional significance. Seat 11a is a concave fillet which fits ring 21.

The flange 18 and ring 8a are relatively so dimensioned that the ring will pass through the opening within the flange, preferably with the minimum practicable clearance.

The construction shown in Fig. 1 is suited to somewhat higher pressures but the construction of Fig. 2 will resist substantial pressures. Ease of assembly is its outstanding advantage.

After rings 14 and 8a have been pressed in just as above described with reference to parts 14 and 8 in Fig. 1, the ring 21 is pushed into seat 19 and, expanding, retains itself. On release of ring 8a the parts assume the position shown in Fig. 2.

In each construction the ring 8 or 8a is positioned with the necessary accuracy by ring 12 or 21. Such rings afford a seal and limited yielding support sufficient to correct for such slight misalignment of ring 15 as might exist. Experience with the device indicates that such misalignment, if it occurs initially because of careless assembly, corrects itself after a few turns of the shaft.

Each embodiment is simple to construct and easy to assemble and the second form can be assembled without any tools.

In the claims the surface 13 (and by reference also the surface 17) will be described as a surface of revolution at least approximating a right circular cone. A right circular cone is illustrated in compliance with the statutes because it is the best embodiment known to applicant. It is simplest to manufacture and uniform in action.

By substituting slightly curved lines for the generatrices of the illustrated right circular cones it would be possible to generate conoids which without responding literally to the definition of a right circular cone, would be functionally indistinguishable. To forestall evasion of this type an inclusive term embracing right circular cones and functionally similar analogues is used.

The terms "torus" and "toric" as used in the claims refer to the geometric solid generated by revolving a circle about a straight line which lies in the plane of the circle and does not intersect the circle.

What is claimed is:

1. The combination of two members mounted to rotate relatively to one another about an axis, one member encircling the other; means affording a plane annular sealing surface substantially fixed on the encircling member and substantially normal to said axis; means affording a surface of revolution at least approximating a right circular cone carried by the encircled member, tapering toward said sealing surface, and coaxial with said axis; an annulus having a generally conical axial bore within which said surface of revolution is received, the surface of the bore being geometrically similar to the first-named surface of revolution but larger to afford an annular substantially uniform interval; a resilient toric sealing member bridging said interval, said sealing member encircling the first named surface of revolution, and being stressed in tension therearound and stressed in compression between the two surfaces of revolution, said surfaces being of such axial extent that the sealing member will roll between them when the annulus and the encircled member are moved relatively in axial directions, said annulus carrying a second plane annular sealing surface normal to the axis of its bore, dimensioned to mate with, presented toward and sustained against motion in an axial direction by the first named plane annular sealing surface.

2. The combination defined in claim 1 in which the two surfaces of revolution converge toward their larger ends sufficiently to compensate approximately for attenuation of said toric sealing member as the latter rolls toward the larger end of the first named surface of revolution.

3. The combination defined in claim 1 in which the means affording a plane annular surface substantially fixed on the encircling member comprises a floating ring, annularly spaced from the encircling member and from the encircled member, and carrying the plane annular surface and having at its outer margin and encircling that face which is remote from said surface an obliquely presented annular channel; means carried by the encircling member providing an opposed obliquely presented annular channel; and a resilient annulus fitting said channels and bridging the interval between them.

4. The combination defined in claim 1 in which the encircling member has an open end, and the means affording a plane annular surface substantially fixed on the encircling member comprises a floating ring dimensioned to be insertable axially through said open end carrying the plane annular surface and having at its outer margin and encircling that face which is remote from said surface an obliquely presented annular channel; retaining means carried by the encircling member, adjacent said open end, and providing an opposed obliquely presented annular channel; and a resilient annulus whose outer circumference when unstressed slightly exceeds that of the second named channel, said resilient annulus being confined by said channels and bridging the interval between them.

5. The combination of a housing having an aperture bounded by a generally cylindrical wall and having an inward-directed flange adjacent its outer end; a rotatable shaft extending coaxially through said aperture and flange, and having inward from said flange a coaxial surface of revolution at least approximating a right circular cone, which tapers outward; a contractile toric sealing member encircling said surface of revolution; an annulus having a bore which is larger than said shaft and said surface of revolution and geometrically similar to the latter, said bore embracing the toric sealing member and said annulus being dimensioned to pass within said flange and having an outward-presented plane annular sealing surface normal to the axis of its bore; a second annulus dimensioned freely to encircle the shaft and to pass within said flange, said second annulus having on its inner face a plane annular sealing surface dimensioned to mate with the outward-presented sealing surface of the first annulus, and having at the periphery of its outer face an obliquely presented annular seat; and a resilient sealing annulus seating around the junction of the cylindrical wall of the aperture and said flange and around said annular seat and filling the annular interval therebetween.

References Cited in the file of this patent

UNITED STATES PATENTS

| | | |
|---|---|---|
| 2,200,151 | Burkhardt | May 7, 1940 |
| 2,590,759 | Dale et al. | Mar. 25, 1952 |
| 2,635,552 | Dale et al. | Apr. 21, 1953 |